United States Patent [19]

Matsui et al.

[11] 4,225,569

[45] Sep. 30, 1980

[54] CARBON-CARBON COMPOSITE MATERIAL AND METHOD FOR ITS PRODUCTION

[75] Inventors: Hironori Matsui, Hirakata; Takashi Ito, Ibaraki, both of Japan

[73] Assignee: Kanebo Ltd., Japan

[21] Appl. No.: 913,692

[22] Filed: Jun. 8, 1978

[30] Foreign Application Priority Data

Jun. 14, 1977 [JP] Japan .................................. 52-70807

[51] Int. Cl.$^2$ .............................................. C01B 31/02
[52] U.S. Cl. ...................................... 423/445; 106/56; 264/29.1; 423/449
[58] Field of Search ..................... 423/445, 449, 447.1, 423/447.2; 264/29.1, 29.2; 106/56

[56] References Cited

U.S. PATENT DOCUMENTS

| | | | |
|---|---|---|---|
| 3,109,712 | 11/1963 | Redfern | 423/449 |
| 3,814,642 | 6/1974 | Araki et al. | 156/60 |
| 4,039,341 | 8/1977 | Cooper et al. | 423/445 X |

FOREIGN PATENT DOCUMENTS

49-27513 7/1974 Japan ...................................... 264/29.1

OTHER PUBLICATIONS

Bradshaw et al., "11th Biennial Conference on Carbon Extended Abstracts and Program" Jun. 1973, pp. 271-272.
Jenkins et al., Proc. R. Soc. Lond. A.327 (1972), pp. 501–517.

*Primary Examiner*—Edward J. Meros
*Attorney, Agent, or Firm*—Wenderoth, Lind & Ponack

[57] ABSTRACT

The present invention provides a carbon-carbon composite material consisting of a matrix carbon and a fibrous reinforcing carbon, said matrix carbon and fibrous carbon consisting substantially of amorphous carbon and forming an interface without an intervening third material, wherein said composite material has a fracture surface showing a uniform vitreous light reflection, but when it is used as an anode and electrolytically etched in sulfuric acid-acidified water, a difference in the degree of etching arises between the matrix carbon and the fibrous carbon, and a method for the preparation thereof. The composite material has a high flexural strength and a very low gas permeability and is useful as a molding material in the fields of high temperature chemistry, the atomic energy industry and medicine.

14 Claims, 6 Drawing Figures

CARBON-CARBON COMPOSITE MATERIAL AND METHOD FOR ITS PRODUCTION

This invention relates to a novel carbon-carbon composite material, and more specifically to a vitreous carbon-carbon composite material composed of a substantially amorphous carbon matrix and a substantially amorphous fibrous reinforcing carbon and having a high flexural strength and a very low gas permeability and to a method for its production.

Carbon fibers have a high tensile strength, and "carbon-carbon composite materials" have heretofore been produced by combining them with other carbonaceous materials.

The carbon-carbon composites have a very high flexural strength and tensile strength, and remove the notion of brittle and weak materials that carbon material gives. They are expected to find extensive applications in the electronics industry, the atomic energy industry, the aerospace industry, etc. by taking advantage of their valuable properties such as high strength, thermal stability and abrasion resistance. Moreover, the carbon-carbon composites have excellent affinity for the living body, and are also expected to be used in artificial bones and roots of teeth.

Some methods for producing these carbon-carbon composite materials have been suggested in the past.

One of them comprises simply shaping a tow, woven or knitted fabric or non-woven fabrc of carbon fibers obtained by carbonizing cellulose or polyacrylonitrile fibers, placing the shaped product in a furnace, heating it to 1,000° to 1,500° C., introducing a hydrocarbon gas into a furnace to decompose and carbonize it at the surface of the carbon fibers, and thus to deposit carbon on the surface of the carbon fibers (this method will be referred to hereinbelow as the CVD method). [See, for example, Super-Temp. Corp. "RPG", Santa Fe Springs, Calif., U.S.A.]

The carbon-carbon composite material obtained by the CVD method, when having a fiber content of, say, 35% by volume, has a flexural strength of 9 to 15 kg/mm$^2$ which is 5 to 6 times that of synthetic graphite, but has the defect that its impact strength is as low as 2 to 4 kg.cm. Furthermore, in the process of its production, the hydrocarbon gas must be heat-decomposed in such a manner as not to generate soot. The method, therefore, has low productivity, and a fairly high level of technique is required to produce uniform carbon material with a reduced number of pores.

Another method comprises shaping a tow, woven or knitted fabric, or non-woven fabric of carbon fibers obtained by carbonizing cellulose or polyacrylonitrile fibers by using a thermosetting resin, heat-treating the shaped product in an inert gas atmosphere to carbonize the resin, and if required, repeating the above steps after cooling (to be referred to as the RP method) [see Carborundum Graphite Products Division, "carbitex", Sanborn, N.Y., U.S.A.].

The carbon-carbon composite material obtained by the RP method, when having a fiber content of 50% by volume, has an impact strength of 12 to 18 kg.cm which is far larger than the composite material obtained by the CVD method, but its flexural strength is 6 to 11 kg/cm$^2$ which is not as high as that of the CVD-method composite.

It has recently been reported in Japanese Patent Publication No. 27513/74 that a carbon-carbon composite material is made by shaping a fibrous product composed of natural or synthetic fibers together with a matrix such as a thermoplastic resin, a thermosetting resin, a mixture of such a resin and a filler, pitch and asphalt, and firing the shaped product. It is difficult, however, to produce by this method a completely unitary carbon-carbon composite of the matrix carbon and the fibrous reinforcing carbon. Production of a carbon-carbon composite having a high strength requires a special care and a long period of time. The method can neither give a composite having superior non-permeability as in vitreous carbon bodies.

Japanese Patent Publication No. 29432/74 discloses a method for producing a carbon-carbon composite which comprises mixing organic fibers, such as pitch fibers, having a hydrogen/carbon atomic ratio, determined by an elemental analysis, of from 0.25 to 0.8, an etheric oxygen content of 3 to 15%, a carbonization yield of at least 50% but not more than 92%, preferably at least 70%, a linear shrinkage at 1,000° C. of 4 to 25%, a diameter of not more than 40 microns and a fiber length/diameter ratio of at least 5 with an organic binder, such as a phenolic resin or furfural resin, having a carbonization yield of at least 10%, pre-shaping the mixture, and firing the precursor. According to this method, however, no special consideration is given to the bonding of the organic fibers with the matrix resin at their interfaces in the precursor. Hence, the bonding of the fibers to the matrix in the precursor is not sufficient, and it cannot withstand various stresses generated within the precursor during firing (e.g., shrinkage, tension, gas evolution) and scale-like swellings called "blisters" or cracks occur. Naturally, the yield of the final product is extremely poor. For the same reason, the method of this patent publication gives only such a carbon-carbon composite product in which the fibrous carbon and the matrix carbon are bonded loosely to provide a discernible interface and cannot afford a composite having a sufficiently high gas permeability.

Furthermore, in the method of Japanese Patent Publication No. 29432/74, if the firing temperature is increased in order to use the composite material for applications requiring a high purity, for example as a crucible for semiconductors, the resulting carbon-carbon composite is more susceptible to graphatization than ordinary vitreous carbon bodies, and its gas-impermeability decreases. At the same time, its chemical resistance and resistance to air oxidation are deteriorated, thus presenting the outstanding differences in properties which have been well known to exist between graphatized products and vitreous carbon products.

One object of this invention is to provide a novel and improved carbon-carbon composite which is free from the defects described hereinabove.

Another object of this invention is to provide a vitreous carbon-carbon composite which consists of a substantially amorphous carbon matrix and a fibrous reinforing carbon and has a very high flexural strength and a very low gas permeability.

Still another object of this invention is to provide a method for producing such a novel carbon-carbon composite material with commercial advantage.

Other objects and advantages of this invention will become apparent from the following description.

According to this invention, there is provided a carbon-carbon composite material consisting of matrix carbon and fibrous reinforcing carbon, said matrix carbon and fibrous carbon being composed of substantially amorphous carbon and forming an interface without an intervening layer of a third material, wherein the composite material has a fracture surface presenting a uniform vitreous light reflection but when it is electrolytically etched as an anode in sulfuric acid-acidified water, a difference in the degree of etching arises between the matrix carbon and the fibrous carbon.

The carbon-carbon composite material of this invention will not be described in more detail below taken partly in conjunction with the accompanying drawings in which.

Figure 3:
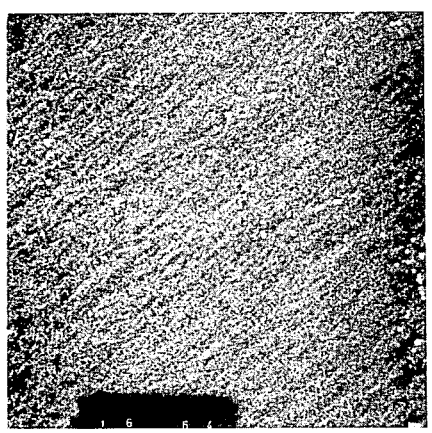
FIG. 3 is an electron microphotograph of the fracture surface of the carbon-carbon composite obtained by firing such a precursor.

The carbon-carbon composite material of this invention is a structure which appears to be a completely unitary body of uniform quality in which the fibrous reinforcing carbon is completely integrated with the matrix carbon. Specifically, the fibrous reinforcing carbon and the matrix carbon form an interface without an intervening layer of a third material. In other words, the fibrous reinforcing carbon is directly bonded with the matrix carbon to form a unitary structure, and it has such a high degree of integration that the boundary line between the fibrous reinforcing carbon and the matrix carbon cannot be discerned not only by a reflective microscope but also by an electron microscope, as shown in FIG. 3.

Figure 1:
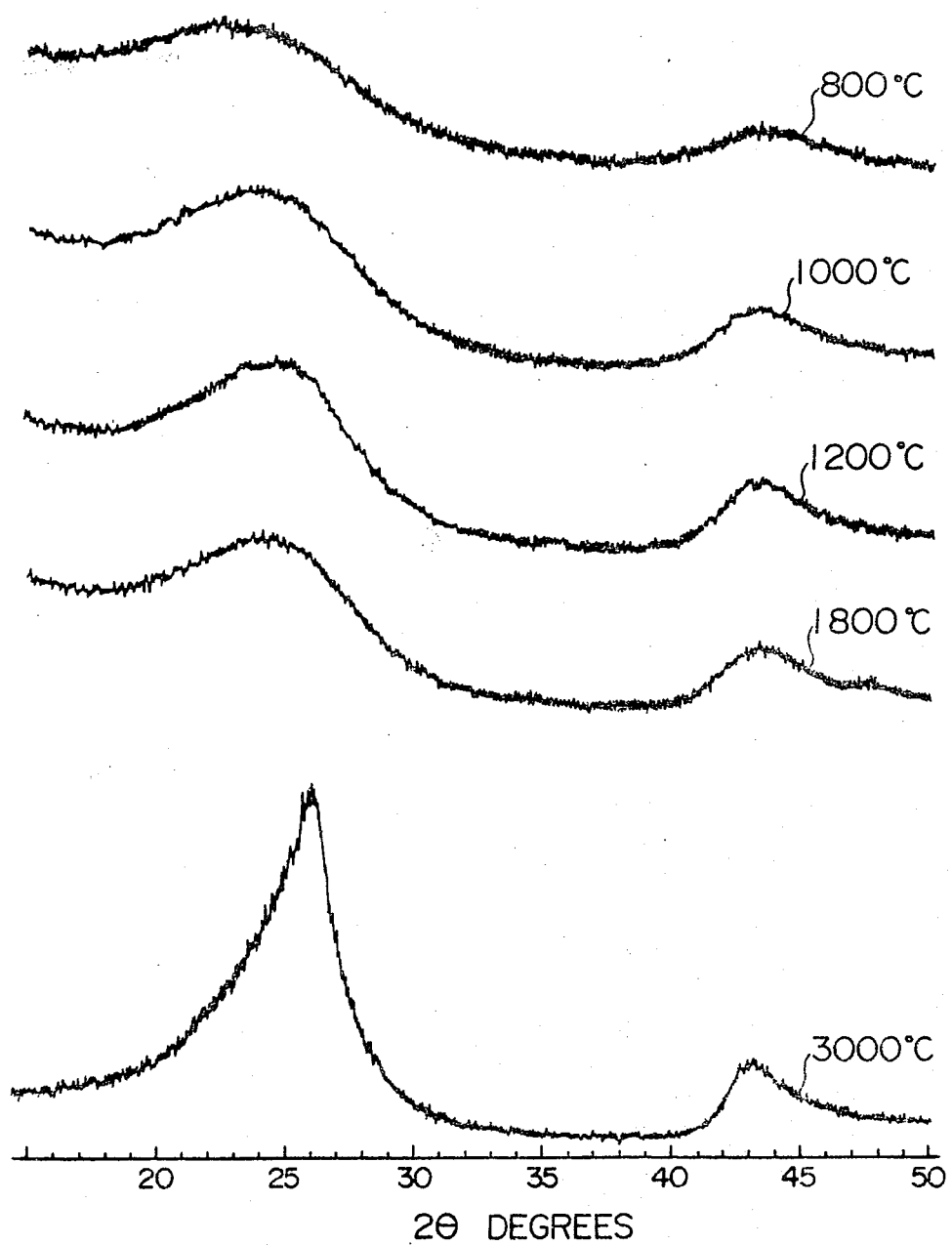
FIG. 1 shows an X-ray diffraction pattern of a carbon-carbon composite material of this invention fired at 800° to 3,000° C.

The matrix carbon and the fibrous reinforcing carbon which constitute the carbon-carbon composite of this invention are composed of substantially amorphous carbon, and the carbon-carbon composite of this invention, as a whole, consists substantially of amorphous carbon. When a powder of the carbon-carbon composite of this invention is measured by an X-ray diffraction method, it does not show a sharp diffraction profile at a diffraction angle of 26° [the diffraction angle at (002) plane] inherent to crystalline carbon, i.e. graphite, but shows a broad diffraction profile at a diffraction angle of 26°. Furthermore, the X-ray diffraction pattern of graphite shows a separated diffraction profile at a diffraction angle of 42° [the diffraction angle at the plane (101)] and a diffraction angle of 44° [the diffraction angle at the (100) plane]. The carbon-carbon composite material of this invention generally does not show a separated diffraction profile at a diffraction angle of 42° to 46°. In the X-ray diffraction pattern of the product fired at 3,000° C. which is shown in FIG. 1 shows a slight sign of sharpness in its diffraction profile at a diffraction angle of 26°. But the diffraction profile at a diffraction angle of 42° to 46° is not separated, and thus it is evident that the resulting fired product still consists substantially of amorphous carbon. The "broad diffraction profile", as used in the present specification and the appended claims, includes a diffraction profile having a widened bottom as shown in FIG. 1 with regard to the case of firing at 3,000° C.

Accordingly, the term "amorphous carbon", as used in the present specification and the appended claims, denotes carbon which shows a broad diffraction profile at a diffraction angle of 26° and does not show a clearly separated diffraction profile at a diffraction angle of 42° to 46°.

The fibrous reinforcing carbon can account for 30 to 90% by weight, preferably 50 to 80% by weight, of the weight of the carbon-carbon composite of this invention, and the remainder can consist of substantially amorphous matrix carbon.

The fibrous reinforcing carbon and the matrix carbon have substantially the same density which is about 1.42 to 1.61 g/cm$^3$, preferably 1.48 to 1.58 g/cm$^3$. Thus, the carbon-carbon composite material of this invention may have a density of about 1.42 to 1.61 g/cm$^3$, preferably 1.48 to 1.58 g/cm$^3$.

Whether the fibrous reinforcing carbon and the matrix carbon have substantially the same density is determined from the fact that no boundary line can be found between them in an electron microscopic examination of the cross section of the carbon-carbon composite and that the density of the composite does not substantially change with varying contents of the fibrous reinforcing carbon at the time of producing the carbon-carbon composite. This is because the carbon-carbon composite, once formed, cannot be separated into the fiber reinforcing carbon and the matrix carbon.

On the other hand, the carbon-carbon composite of this invention is of extremely high purity, and generally contains at least 94% by weight, preferably at least 96% by weight, and at times at least 98% by weight, of carbon.

Figure 4:
FIG. 4 is a photograph of the fracture surface of the carbon-carbon composite of the invention, from which it will be appreciated that the fracture surface has a vitreous luster.

One characteristic feature of the carbon-carbon composite of this invention is that in spite of the fact that it is composed of the fibrous reinforcing carbon and the matrix carbon, it presents a uniform vitreous light reflection and has an optically isotropic fracture surface same as in conventional carbon products called glassy carbon or vitreous carbon. Specifically, when a shaped article of the carbon-carbon composite of the invention is broken, the broken surface is very similar in appearance to that of a shaped article of glass. The broken surface appears uniform by observation with a reflective microscope and a polarized reflective microscope and has a high level of luster, as shown in FIG. 4. Such a characteristic in appearance of the carbon-carbon composite of this invention is one of the important characteristics which enables it to be distinguished from conventional carbon-carbon composites.

Another important characteristic of the carbon-carbon composite of this invention is that although the carbon-carbon composite is seen to be homogeneous in appearance, when it is electrolytically etched as an anode in water acidified with sulfuric acid, a difference in the degree of etching arises between the matrix carbon and the fibrous reinforcing carbon. This is why the carbon product of this invention is determined to be a carbon-carbon composite, and it is this characteristic that distinguishes the product of the present invention clearly from conventional glassy or vitreous carbon bodies.

When the composite of this invention used as an anode is electrolytically etched in an aqueous solution containing sulfuric acid in a concentration of 30 to 70% by weight, preferably about 50% by weight, at a current density of 100 to 1,000 mA/cm$^2$, preferably about 500 mA/cm$^2$, using lead or platinum as a cathode for at least 10 minutes, preferably for 20 to 60 minutes, the anode (i.e., the composite of this invention) is etched by the attack of nascent oxygen. A clear difference in the degree of etching is observed between the matrix carbon and the fibrous reinforcing carbon in the composite of the invention. Generally, the degree of etching is large in the matrix carbon, and is small at the fibrous reinforcing carbon. Hence, the electrolytically etched composite material of this invention presents such an appearance that the fibrous reinforcing carbon portion is raised and the matrix carbon portion is depressed.

By virtue of the aforesaid characteristics, the composite of this invention exhibits various superior mechanical, electrical, physical and chemical properties.

For example, the composite of this invention, depending upon its composition, has a flexural strength of at least 900 kg/cm$^2$, preferably at least 1,000 kg/cm$^2$, more preferably 1,050 to 1,200 kg/cm$^2$. Moreover, the composite of this invention is very compact, and has a very low gas permeability. For example, its permeability to a helium gas is generally not more than $10^{-6}$ cm$^2$/sec, preferably not more than $10^{-7}$ cm$^2$/sec, and more preferably not more than $10^{-8}$ cm$^2$/sec.

The composite of the invention is very hard as demonstrated by its Vickers hardness of at least 350 kg/mm$^2$, preferably at least 800 kg/mm$^2$, more preferably at least 1,000 kg/mm$^2$.

The electric conductivity of the composite of this invention is lower than that of ordinary carbon products or graphite. Generally, it has a specific electrical resistance of 1 to $20 \times 10^{-3}$ ohm-cm, preferably 4 to $15 \times 10^{-3}$ ohm-cm, more preferably 5 to $12 \times 10^{-3}$ ohm-cm. The thermal conductivity of the composite of the invention is far lower than those of ordinary carbon products or graphite, and may usually be 1 to 40 kcal/m.hr.°C., especially 2 to 10 kcal/m.hr.°C.

The composite of this invention also has superior thermal stability, and can sufficiently withstand temperatures of generally up to about 550° C., and usually up to about 520° C., in the air. It has very good chemical resistance, and is not attacked by most organic and inorganic chemicals and are found passable in chemical resistance tests in most chemicals.

The carbon-carbon composite of this invention is therefore useful as a material for a reaction apparatus involving the use of corrosive liquids or gases, a heat exchanger, a thermocouple-protecting tube, an electrode, etc. in the high temperature chemical industry; as a coating material for waste matter, for example, in the atomic energy industry; as a material for semiconductors; and as roots of teeth or artificial joints, etc. in the medical field.

According to this invention, the carbon-carbon composite having the aforesaid superior characteristics can be advantageously produced by a method which comprises shaping a resinous composition composed of 30 to 90% by weight of cured novolac fibers with a methylol group content of at least 3.5% by weight and 10 to 70% by weight of a phenolic resin calculated as the solids content of the cured phenolic resin, curing the shaped product, heating the cured product in a non-oxidizing atmosphere in such a manner that at least within the range of 200° to 500° C., the heating is carried out at a rate of not more than 60° C./hour, and firing the product at at least 800° C.

A first characteristic of the method of this invention is the use of cured novolac fibers containing a methylol group content of at least 3.5% by weight, preferably 4 to 8% by weight, more preferably 5 to 7% by weight, as a precursor for fibrous reinforcing carbon. It has been found that by using cured novolac fibers having such a specified methylol group content, the methylol groups present on the surface of the cured novolac fibers effectively react with the phenolic resin as a matrix to form a compactly integrated carbon-carbon composite in which the fibrous reinforcing carbon and the matrix carbon form an interface without an intervening third material, and the yield of the carbon-carbon composite can be increased greatly.

The cured novolac fibers used in this method can be produced by melt-spinning a novolac resin, and curing the resulting novolac fibers with an aldehyde.

The novolac resin is an uncured meltable thermoplastic resin which can be produced by reacting (polycondensing) a phenol and an aldehyde under heat, usually in the presence of an acidic catalyst. In the present invention, novolac resins having a number average molecular weight of usually about 500 to about 2,000, especially about 700 to about 1,500, are used.

The phenols used for producing the novolac resins are most commonly phenol and cresol. But other phenols can also be used. Examples of these phenols are phenol, o-cresol, m-cresol, p-cresol, 2,3-xylenol, 2,5-xylenol, 2,4-xylenol, 2,6-xylenol, 3,4-xylenol, 3,5-xylenol, o-ethylphenol, m-ethylphenol, p-ethylphenol, p-phenylphenol, p-tertiary butyl phenol, p-tertiary amylphenol, bisphenol A, resorcinol, and mixtures of two or more of these phenols.

The aldehyde most commonly used for polycondensing with the above phenols is formaldehyde, but the monoaldehydes and dialdehydes such as paraformaldehyde, hexamethylenetetramine, furfural, glutaraldehyde, adipoaldehyde and glyoxal can also be utilized.

The acidic catalyst used for the reaction of forming the novolac resins may be any known organic or inorganic acid, for example, hydrochloric acid, nitric acid, sulfuric acid, phosphoric acid, formic acid, p-toluenesulfonic acid, acetic acid, oxalic acid or phthalic acid.

Methods for producing novolac resins from such phenols and aldehydes are well known in the art, and they can be produced, for example, by the method described in U.S. Pat. No. 3,650,102.

Melt-spinning of novolac resins has also been well known. Novolac fibers can be produced, for example, by the method described in the above-cited U.S. Pat. No. 3,650,102 which comprises heating a novolac resin in an atmosphere of an inert gas such as carbon dioxide or nitrogen to form a flowable melt, and extruding or drawing the melt into an inert cooling medium such as air, nitrogen or water through a spinneret having nozzles of the desired size to cool and solidify the filaments.

According to the method of this invention, the inclusion of at most 30% by weight, preferably at most 15% by weight, based on the weight of the novolac resin, of another fiber-forming thermoplastic resin such as polyamides, polyurethane, polyesters, or polyolefins is permissible during the melt-spinning of the novolac resin.

The uncured novolac fibers so spun are then cured. The curing can also be performed by a known method. For example, the novolac fibers are heated to a temperature of about 90° to 105° C. in an aqueous solution containing an acid catalyst and an aldehyde. Or the uncured novolac fibers are pre-cured by heating them to a temperature of about 70°to 105° C. in an aqueous solution containing an acidic catalyst and an aldehyde, and the pre-cured novolac fibers are then heated in an aqueous solution containing a basic catalyst and an aldehyde to a temperature of about 70° to 95° C. Examples of suitable aldehydes and acidic catalysts for use in the curing of the novolac fibers are those given hereinabove for the production of novolac resins. Examples of the basic catalyst are sodium hydroxide, potassium hydroxide, calcium hydroxide, barium hydroxide, lithium hydroxide, magnesium hydroxide, strontium hydroxide, ammonia, dimethylamine, methylamine, and hexamethylenetetramine. Usually, ammonia and hexamethylenetetramine are used advantageously.

Adjustment of he methylol group content of the cured novolac fibers to the aforesaid range can be achieved by properly controlling the concentrations of the acidic or basic catalyst and the aldehyde in the curing bath, and/or the reaction time. The suitable concentration of catalyst is 10 to 20% by weight, and the suitable concentration of the aldehyde is 6 to 15% by weight. The reaction time is preferably 3 to 10 hours.

The "methylol group content" of the cured novolac fibers, as used in the present specification and the appended claims, is determined by the method to be described hereinbelow.

Desirably, the novolic fibers so cured have a fiber length of generally at least 0.4 mm, preferably at least 1.0 mm. The fiber diameter is not critical, but is advantageously in the range of usually 5 to 60 microns, preferably 10 to 40 microns. Thus, cured novolac fibers that can be used suitably in the method of this invention may have a length/diameter ratio of at least 40, preferably at least 100.

The cured novolac fibers can be used in the method of this invention in the form of short or long fibers which are processed into a sheet, woven fabric, knitted fabric, non-woven fabric, roving, chopped strand, or staple. It is especially preferred to use them in the form of a woven fabric, non-woven fabric or staple.

The phenolic resin to be used in combination with the cured novolac fibers is a pre-condensate produced by reacting a phenol such as those exemplified hereinabove for the production of novolac resins with an aldehyde such as those exemplified hereinbove for the production of novolac resins in the presence of an acidic or basic catalyst such as those exemplified hereinabove in accordance with well known methods. Usually, the phenolic resin includes self-heat-curable resols having a molecular weight of up to about 600 and a large methylol group content and obtained by reaction in the presence of a basic catalyst, and thermoplastic novolacs having a molecular weight of 300 to 2,000 in which the phenol is bonded mainly through a methylene linkage and which are obtained by reacting the phenol with the aldehyde in the presence of an acidic catalyst. In the method of this invention, the resols can be used especially advantageously.

According to the method of this invention, the cured novolac fibers and the phenolic resin are mixed to form a resinous composition having the cured novolac fibers dispersed in a matrix of the phenolic resin. Mixing of the curved novolac fibers with the phenolic resin can be performed by known methods. For example, when the phenolic resin is a liquid, it is impregnated into a structure composed of the fibers. When the phenolic resin is a solid, it is finely pulverized, and then kneaded with the fibers by using a kneader, hot rolls, etc.

The mixing ratio between the cured novolac fibers and the matrix of the phenolic resin can be varied over a wide range according, for example, to the form of the novolac fibers, their methylol group content and the type of the phenolic resin. The amount of the cured novolac fibers is generally 30 to 90% by weight, preferably 40 to 85% by weight, more preferably 50 to 80% by weight, based on the weight of the resinous composition. The phenolic resin, on the other hand, can be incorporated in an amount of 10 to 70% by weight, preferably 15 to 60% by weight, more preferably 20 to 50% by weight, calculated as the solids content of the cured phenolic resin based on the weight of the resinous composition.

In the present specification and the appended claims, the amount of the phenolic resin is shown in terms of the solids content of the cured phenolic resin. The amount of the phenolic resin to be actually mixed in a given process can be readily determined by curing the same phenolic resin by the same method as will be used in the process and calculating the ratio of the weight of the phenolic resin before curing to that of the cured phenolic resin; and multiplying the solids content of the cured phenolic resin by the calculated ratio.

If desired, the resinous composition may include other additives such as a furan-type resin, an epoxy-type resin, a mixture of a vinyl polymer and a divinyl compound, a urea resin, an unsaturated polyester resin, a melamine resin, and a pitch or petroleum resin in a small amount of, say, not more than 20% by weight based on the weight of the phenolic resin.

The resinous composition so prepared is then shaped into a desired form such as a sheet, rod, cylinder, bloc, film, sphere or capsule. It is important to produce the shaped article in a larger size than is actually required because the product will shrink in the subsequent heating and firing steps. The shaping operation can be performed by applying known FRP (fiber-reinforced plastic) shaping methods such as a mold method, a hand lay up method, a spray up method, a filament winding method, a centrifugal molding method, a plutrusion method, a prepreg mat method, a premix method, a preform method, and a cross winding method. Of these, the methods involving molding under pressure are preferred.

The resinous composition so shaped can be cured as such or under a pressure of preferably about 10 to 300 kg/cm$^2$.

Curing of the shaped resinous composition can be performed in accordance with an ordinary curing method for phenolic resins, usually by heating. When the matrix phenolic resin is a resol resin, the composition is simply heated at a temperature of usually 110° to 180° C., preferably 130° to 160° C., for about 0.15 to 24 hours without using a curing agent. When the matrix phenolic resin is a novolac resin, at least 1 equivalent, preferably 1.1 to 2.0 equivalents, per equivalent of the novolac resin, of formaldehyde or a compound capable of releasing formaldehyde under the curing conditions such as hexamethylene tetramine, paraformaldehyde, trioxane, tetraoxane or glyoxal is introduced at the time of combining the cured novolac fibers or a fibrous structure composed of the fibers with the novolac resin, and in the presence of such a curing agent, the shaped resinous composition is heated at a temperature of 110° to 180° C., preferably 130° to 160° C., for 0.15 to 24 hours.

The shaped and cured resinous composition is then heated to a carbonization temperature of at least 800° C., preferably at least 1,000° C., most suitably at least 1,200° C., in a non-oxidizing atmosphere, that is, under reduced pressure or in an atmosphere of an inert gas such as nitrogan gas, carbon dioxide gas, carbon monoxide gas, argon gas, helium gas, and halogen gases. There is no upper limit to the firing temperature, but from the standpoint of equipment and economy, temperatures of up to 3,500° C. are sufficient.

Another great characteristic of the method of this invention is that in the heating step, at least within the range of 200° to 500° C., the heating is carried out at a rate of not more than 60° C./hour, preferably not more than 40° C./hour, more preferably not more than 20° C./hour. Within the temperature ranges lower than 200° C. and higher than 500° C., the heating may be carried out at the above specified rates or at faster rates.

The present inventors have found that at about 200° C., gaseous oxygen compounds such as $H_2O$, HCHO, CO and $CO_2$ being to be released from the shaped resinous composition, and at temperatures about 500° C., evolution of hydrogen gas is observed.

It has been found specifically that within a range of 200° to 500° C., the methylol groups in the novolac fibers chemically react in various ways with reactive residues (e.g., a methylol group) in the matrix of cured phenolic resin to absorb the generated distortions and integrate the resinous composition, and the integrated composition is then submitted to a carbonization treatment at high temperatures. Accordingly, special care must be taken about the rate of temperature raise within this temperature range, and it has been found that the rate of heating is very desirably not more than 60° C./hour. When the rate of heating is faster than 60° C./hour, the resinous composition is carbonized without the absorption of the distortions and slow chemical reactions. Accordingly, the resulting carbon-carbon composite will be unacceptable because of blisters or cracks formed or of poor strength, and the yield of the product will decrease.

The heating of the shaped and cured resinous composition can be performed in a customary manner by maintaining it in a single furnace, a continuous furnace, an electric firing furnace or a tunnel furnace at the aforesaid firing temperature for at least about 0.15 hour, usually 1 to 72 hours.

The carbonized carbon-carbon composite is cooled to below about 500° C., and then withdrawn from the furnace.

The method of this invention described hereinabove can afford a carbon-carbon composite having the aforesaid characteristics.

According to the method of this invention, carbon-carbon composites of various shapes and sizes can be freely and easily produced, and the yield of the product in commercial production is good. The firing time can be drastically shortened, and the cost of production can be reduced.

The following Examples further illustrate the present invention.

The various properties indicated in the following Examples were measured by the following methods.
(1) Determination of methylol groups in the cured novolac fibers:

Preparation of a Calibration Curve

A novolac resin being substantially free from a methylol group (i.e., no absorption at 995 cm$^{-1}$ ascribable to the methylol group in the infrared absorption spectrum determined by the KBr tablet method) and having a number average molecular weight of 1,000 (intrinsic viscosity [$\eta$] of 0.076) was mixed uniformly with a resol having a known methylol group content. The infrared absorption spectrum of the mixture was determined by the KBr tablet method. By analytical method to divide the overlapping peak of the spectrum, the absorption intensity (to be referred to as "D955") at 995 cm$^{-1}$ (an absorption peak ascribable to the methylol group) and the absorption intensity (to be referred to as "D1600") at 1600 cm$^{-1}$ (an absorption peak ascribable to benzene), and the absorption intensity ratio (D995/D1600) was calculated.

The above procedure was repeated except the amount of the resol (i.e., the methylol group content) was varied.

The absorption intensity ratios and the total amount of the methylol groups in the resol mixed were plotted in a graph to form a calibration curve.

Determination of the Methylol Groups in the Cured Novolac Fibers

A sample of the cured novolac fibers was pulverized in a mortar, and its infrared absorption spectrum was determined by the KBr tablet method. The absorption intensity ratio (D995/D1600) was determined in the manner described above. The absorption intensity ratio was applied to the calibration curve previously prepared, and the methylol group content corresponding to the absorption intensity ratio was read. The value read was the methylol group content of the sample.
(2) Yield in the firing step The number of perfectly finished carbon-carbon composites obtained was expressed in percent based on the number (100) of precursors charged into a firing furnace.
(3) Tensile strength and heat distortion temperature of the precursor Measured in accordance with JIS K6911
(4) Flexural strength of the carbon-carbon composite Measured by a modified version of the method of JIS K6911.
(5) Gas permeability of the carbon-carbon composite Measured by a volume changing method using a helium gas in a device substantially conforming to ASTM D-1434.
(6) Density A sample was pulverized, and its density was measured by a floating-sinking method.
(7) Thermal stability of the carbon-carbon composite Measured at a temperature at which a decrease in weight begins in a T.G.A. device in which the temperature was raised at a rate of 5° C./min. in the air.
(8) Hardness of the carbon-carbon composite Measured by a Vickers method micro hardness tester under a load of 500 kg.
(9) X-ray diffraction pattern of the carbon-carbon composite A sample was pulverized by a disc-type pulverizer made of tungsten carbide, and the X-ray pattern was measured by a diffractometer under the radiation of CuK$\alpha$ using a nickel filter.

(10) Specific electric resistance of the carbon-carbon composite

Measured by a voltage dropping method in accordance with JIS R-7202.

All percentages in the Examples are by weight unless otherwise indicated.

EXAMPLE 1

A 10-liter separable flask was charged with 6.5 kg of phenol, 3.4 kg of 44% formaldehyde and 20 g of oxalic acid, and with stirring, the mixture was heated from 20° C. to 100° C. over the course of 5 hours. Then, the mixture was heated at this temperature for 1 hour, and then heated at 20 mmHg to 180° C. over the course of 3 hours to remove water, the unreacted matter and low-boiling compounds. The resulting novolac resin has a number average molecular weight of 1,000 and an intrinsic viscosity of 0.076.

The novolac resin was melt-spun at 150° C. The fibers obtained were heated to 97° C. over the course of 3 hours in a curing bath containing an aqueous solution of hydrochloric acid and formaldehyde in the various ratios shown in Table 1 with the ratio of the fibers to the curing bath being maintained at 1:20. The fibers were maintained at 96° to 98° C. for 7 hours (for 15 hours in Run No. 4), and then washed with water. They were then immersed in a mixed aqueous solution containing 1% of ammonia and 55% of methanol, and treated at 60° C. for 60 minutes. The treated fibers were washed with water and dried. The methylol group content of the fibers and the strength of the fibers were determined. The results are shown in Table 1.

The spinning was performed so that the fiber diameter became 18.6 to 19.5 microns.

The fibers were cut to a length of 6 mm, and subjected to a beater to improve their dispersibility. These fibers were mixed with a resol resin having a gellation time (temperature × time) of 140° C. × 100 sec. by a kneader to form various resinous compositions containing 50% of the fibers. Each of the compositions was dried indoors, in an oven and further in vacuum, weighed, and formed into a rectangular shaped material. The material was then shaped and cured in a mold heated at 150° C. to form a precursor having a width of 20 mm, a thickness of 10 mm and a length of 120 mm.

The precursor was each heated in a stream of argon gas from room temperature to 200° C. at a rate of 100° C./hour, from 200° C. to 500° C. at a rate of 50° C./hour, and from 500° C. to 1,000° C. at a rate of 80° C./hour, and further fired at 1,000° C. for 5 hours. Products having blisters or cracks were removed, and the yield, gas permeability and flexural strength of the remaining products were measured. The results are shown in Table 1.

The carbon contents of the carbon-carbon composites obtained were 97 to 98% by weight. By an X-ray diffraction analysis, all of the composites showed a broad diffraction profile at a diffraction angle of 26°, and did not show a diffraction profile separated into two peaks at a diffraction angle of 42° to 46°.

EXAMPLE 2

Cured novolac fibers having a methylol group content of 5% and a diameter of 16.5 microns which had been obtained by the same procedure as in Run No. 2 of Example 1 except that the concentration of hydrochloric acid in the curing bath was changed to 18.0% were cut to a length of 6 mm. The cut fibers were blended with a molding novolac resin (granular) containing 3% by weight of hexamethylene tetramine and having a number average molecular weight of 540 by a hot roller to form resinous compositions containing 10 to 95% by weight of the fibers. Precursors were obtained by shaping and curing the resulting resinous compositions in the same way as in Example 1.

The moldability of the resinous compositions, represented by such factors as mold releasability, fidelity to a mold, bubbling, cracks, warping, dimensional stability and surface finish, was comprehensively evaluated. The mechanical characteristics of the resulting precursors were also measured. The results are shown in Table 2.

These precursors were each fired in vacuum at 900° C. by the same firing method as in Example 1, and the yield, flexural strength and density of each carbon-carbon composite were measured. The results are also shown in Table 2.

Table 2

| Fiber content (%) | Comprehensive evaluation of moldability | Yield (%) | Tensile strength of the precursor (kg/mm$^2$) | Flexural strength of the carbon-carbon composite (kg/cm$^2$) | Density of the carbon-carbon composite (g/cm$^3$) |
|---|---|---|---|---|---|
| 10 | Poor (mold releasability, fidelity) | 74 | 4.2 | 320 | 1.56 ± 0.05 |
| 30 | Slightly good | 97 | 6.5 | 930 | 1.56 ± 0.05 |
| 60 | Good | 100 | 8.1 | 1130 | 1.56 ± 0.05 |
| 90 | Slightly good | 99 | 7.4 | 1070 | 1.56 ± 0.05 |
| 95 | somewhat poor | | | | |

Table 1

| | Curing bath | | Properties of the cured novolac fibers | | Properties of the carbon-carbon composite | | |
|---|---|---|---|---|---|---|---|
| Run No. | Concentration of HCl (%) | Concentration of HCHO (%) | Methylol group content (%) | Strength (g/d) | Yield (%) | Gas permeability (cm$^2$/sec) | Flexural strength (kh/cm$^2$) |
| 1 | 21.0 | 14.0 | 3 | 1.7 | 82 | $10^{-7}$ | 790 |
| 2 | 19.0 | 14.0 | 4 | 1.7 | 98 | $10^{-10}$ | 1070 |
| 3 | 17.5 | 14.0 | 6 | 1.8 | 100 | $10^{-10}$ | 1100 |
| 4 | 19.0 | 17.5 | 8 | 1.6 | 99 | $10^{-10}$ | 1040 |
| 5 | 14.0 | 17.5 | 10 | 1.2 | 86 | $10^{-7}$ | 720 |

Table 2-continued

| Fiber content (%) | Comprehensive evaluation of moldability | Yield (%) | Tensile strength of the precursor (kg/mm$^2$) | Flexural strength of the carbon-carbon composite (kg/cm$^2$) | Density of the carbon-carbon composite (g/cm$^3$) |
|---|---|---|---|---|---|
| | (bubbles) | 91 | 5.1 | 800 | 1.56 ± 0.05 |

These carbon-carbon composites had a carbon content of about 97% by weight, and excepting the one having a fiber content of 95%, a gas permeability of $10^{-8}$ to $10^{-10}$ cm$^2$/sec. By an X-ray diffraction pattern, all of these composites showed a broad diffraction profile at a diffraction angle of 26°, and showed no separated profile at a diffraction angle of 42° to 46°. When the five composites having a fiber content of 10 to 95% in Table 2 were compared, it was found that no correlation exists between the fiber content and the average density value, and in a microscopic observation, the matrix portion and the reinforcing fiber portion could not be distinguished. From this, it is believed that the densities of the matrix portion and the reinforcing material portion are substantially the same.

EXAMPLE 3

In this Example, a precursors obtained by using cured novolac fibers having a methylol group content of 6% was used, and the rate of temperature raising within a temperature range of 200° to 500° C. was examined.

In a stream of nitrogen gas, the precursor was heated from room temperature to 200° C. at a rate of 70° C./hour, from 200° C. to 500° C. at each of the temperature raising rates shown in Table 3, and from 500° C. to 1,200° C. at rate of 100° C./hour, and maintained at 1200° C. for 1 hour. The yields, gas permeabilities, flexural strengths and carbon contents of the resulting carbon-carbon composites were measured. The results are shown in Table 3.

Table 3

| Temperature raising rate within the range of 200 to 500° C. (° C. hour) | Yield (%) | Gas permeability (cm$^2$/sec) | Flexural strength (kg/cm$^2$) | Carbon content (wt.%) |
|---|---|---|---|---|
| 20 | 100 | $10^{-10}$ | 1,200 | 98.3 |
| 60 | 98 | $10^{-7}$ | 930 | 98.1 |
| 100 | 65 | $10^{-5}$ | 520 | 98.1 |

By an X-ray diffraction pattern, all of the composites showed a broad diffraction profile at a diffraction angle of 26°, and did not show a separated diffraction profile at a diffraction angle of 42° to 46°. They were thus found to comprise amorphous carbon.

EXAMPLE 4

Fibers having a methylol group content of 7% and a fiber diameter of 15.0 microns, which had been obtained in the same way as in Run No. 3 of Example 1 except that the fibers were maintained at 96° to 98° C. for 10 minutes in a hydrochloric acid-formaldehyde aqueous solution (curing bath), were cut to a length of 3 mm and formed into a paper-like sheet having a basis weight of 100 g/m$^2$ by an ordinary wet sheet-forming method using a resol as a binder.

The sheet was then impregnated with a resol for laminating purpose having a gellation time of 140° C.×140 sec. so that the fiber content became 70%. The impregnated sheet was pressed to make it compact. Thus, prepregs were formed. Ten or more of the prepregs were laminated, and pressed at 150° C. for 30 minutes to afford a laminated precursor having a thickness of 3 mm.

The precursor was heated in an atmosphere of nitrogen from room temperature to 200° C. at a rate of 60° C./hour, from 200° C. to 500° C. at a rate of 10° C., and from 500° C. to each of the temperatures shown in Table 4 at a rate of 80° C., and then maintained for 3 hours at each of the final temperatures attained.

The specific electrical resistances, thermal stabilities, flexural strengths and elemental analysis values of the resulting carbon-carbon composites were measured, and the results are shown in Table 4.

Table 4

| Treating temperature (°C.) | Specific electric resistance (ohms-cm) | Thermal stability (°C.) | Flexural strength (kg/cm$^2$) | Elemental analysis values (%) | |
|---|---|---|---|---|---|
| | | | | Carbon | Hydrogen |
| 700 | $10^{-7}$ | 508 | 860 | 93.4 | 0.69 |
| 800 | $10^{-1}$ | 519 | 1140 | 96.2 | 0.36 |
| 1000 | $10^{-2}$ | 522 | 1220 | 98.0 | 0.25 |
| 1200 | $10^{-3}$ | 523 | 1200 | 98.7 | 0.09 |
| 1800 | $10^{-4}$ | 523 | 1060 | 99.0 | 0.06 |
| 3000 | $10^{-5}$ | 523 | 980 | 99.3 | 0.03 |

The carbon-carbon composites excepting the one treated at 700° C. were tested for their gas permeability and powder X-ray diffraction. These composites had a gas permeability of as good as $10^{-9}$ to $10^{-10}$ cm$^2$/sec. The X-ray diffraction patterns in FIG. 1 show a broad diffraction profile at a diffraction angle of 26°, and no separated diffraction profile at a diffraction angle of 42° to 46°. It is seen therefore that these carbon-carbon composites consisted of amorphous carbon.

Figure 2:
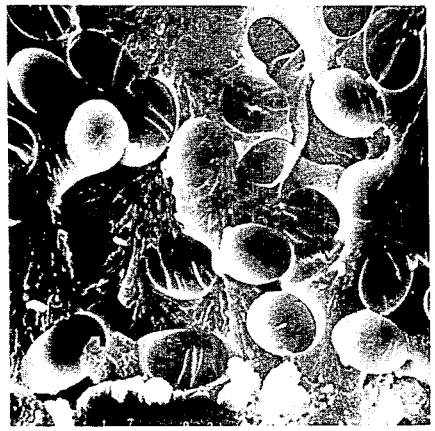
FIG. 2 is an electron microphotograph of the fracture surface of the precursor used in firing.

The fracture surfaces of the precursor and the carbon-carbon composite obtained by treatment at 1,000° C. were observed by a scanning electron microscope. The electron microphotographs of them are shown in FIGS. 2 and 3. FIG. 2 shows the fracture surface of the precursor, while FIG. 3, the fracture surface of the carbon-carbon composite. In FIG. 3, no interface between the fibers and the matrix is seen to exist. It will be appreciated therefore that the composite is a completely integrated vitreous body of uniform quality.

EXAMPLE 5

A mixture of 113 g (1.20 moles) of phenol, 30 g (1.00 mole) of formaldehyde and 1 g of oxalic acid was heated from room temperature to 100° C. at a rate of 30° C./hour. The resulting novolac resin is referred to as resin N.

Resin N-1 was maintained at 100° C. for 1 hour to obtain a novolac resin (N-2).

Resin N-2 was heated to 180° C. to form a novolac resin 'N-3).

Resin N-3 was maintained at 180° C. for 1 hour to form a novolac resin (N-4).

Resin N-4 was defoamed at 180° C. under a pressure of 50 mmHg for 3 hours to form a novolac resin (N-5).

Resin N-5 was defoamed at 10 mmHg for 3 hours to form a novolac resin (N-6).

Resin N-6 was defoamed at 5 mmHg for 3 hours to form a novolac resin (N-7).

Resin N-6 was defoamed at 5 mmHg for 20 hours to form a novolac resin (N-8).

Resin N-8 was defoamed at 190° C. and $10^{-1}$ mmHg to form a novolac resin (N-9).

The number average molecular weights of these novolac resins were measured, and the results are shown in Table 5.

Each of these novolac resins was melt-spun under optimal spinning conditions for each at an extruding pressure of 50 cm H$_2$O using a spinneret with an orifice diameter of 0.20 mm to form uncured novolac fibers. The maximum wind-up speed (m/min.) and the number of filament breakage during a period of 10 minutes at the same wind-up speed were measured. The results are shown in Table 5.

The uncured novolac fibers were cured at 97° C. for 7 hours in an aqueous solution containing 17.5% of hydrochloric acid and 14.0% of formaldehyde to form cured novolac fibers. The strengths of these fibers were measured, and are shown in Table 5.

The cured novolac fibers prepared from the novolac resins Nos. 1 to 9 were found to have a methylol group content of 6 to 7% by weight.

Table 5

| Novolac resin | Number average molecular weight of the novolac resin | Spinnability | | Strength of the cured novolac fibers (g/d) |
|---|---|---|---|---|
| | | Number of filament breakage during 10 minutes | Maximum wind-up speed (m/min.) | |
| N-1 | 320 | 8 | 240 | 0.9 |
| N-2 | 480 | 6 | 430 | 1.1 |
| N-3 | 540 | 0-2 | 820 | 1.5 |
| N-4 | 780 | 0-1 | 1000 | 1.7 |
| N-5 | 880 | 0-1 | 1200 | 1.8 |
| N-6 | 1000 | 0-1 | 1200 | 1.8 |
| N-7 | 1480 | 0-1 | 1200 | 1.7 |
| N-8 | 1880 | 0-2 | 800 | 1.5 |
| N-9 | 2210 | 6 | 410 | 0.9 |

Resins Nos. 3 to 8 had good spinnability, and the cured novolac fibers prepared from resins Nos. 4 to 7 had feasible strength.

The cured novolac fibers were cut to a length of 10 mm, and formed into a precursor and then fired in the same way as in Example 1.

The yields, flexural strengths and gas permeabilities of the resulting carbon-carbon composites were measured, and the results are shown in Table 6.

| Novolac resin | Yield (%) | Flexural strength (kg/cm$^2$) | Gas permeability. (cm$^2$/sec) |
|---|---|---|---|
| N-1 | 37 | 690 | $10^{-5}$ |
| N-2 | 55 | 770 | $10^{-7}$ |
| N-3 | 83 | 940 | $10^{-9}$ |
| N-4 | 92 | 1050 | $10^{-10}$ |
| N-5 | 100 | 1100 | $10^{-10}$ |
| N-6 | 100 | 1100 | $10^{-10}$ |
| N-7 | 93 | 1070 | $10^{-10}$ |
| N-8 | 82 | 930 | $10^{-7}$ |
| N-9 | 51 | $10^{-6}$ | |

These carbon-carbon composites had a carbon content of 97 to 98% by weight.

EXAMPLE 6

The cured novolac fibers prepared in Example 5 from novolac resin N-6 were cut to a length of 70 mm and spun on a spinning frame to form yarns having a twist of 13.9 T/in. The yarns were woven to form a twill fabric having a basis of 285 g/m$^2$. The fabric had a tensile strength of 31 kg/25 mm in the warp direction and 24 kg/25 mm in the weft direction.

The woven fabric was dipped in a solution of a resol resin having a gellation time of 130° C.×110 sec. in methanol, and then dried to form a prepreg having a fiber content of 50%. Fifteen prepregs were laminated and consolidated by a laminating press heated at 150° C. to form a precursor.

The precursor was fired in the same way as in Example 1 to afford a carbon-carbon composite having a thickness of 2.8 mm, a flexural strength of 1,130 kg/cm$^2$, a gas permeability of $10^{-10}$ cm$^2$/sec., a Vickers hardness of 1,191 kg/cm$^2$, and a carbon content of 98.0% by weight.

The broken surface of the carbon-carbon composite, as shown in FIG. 4, showed a uniform vitreous light reflection.

The resulting carbon-carbon composite was used as an anode, and electrolytically etched in a 50% by weight aqueous solution of sulfuric acid at a current density of 500 mA/cm$^2$ for 0.7 hour. A platinum plate having a sufficiently larger size than the anode was used as a cathode.

Figure 5:
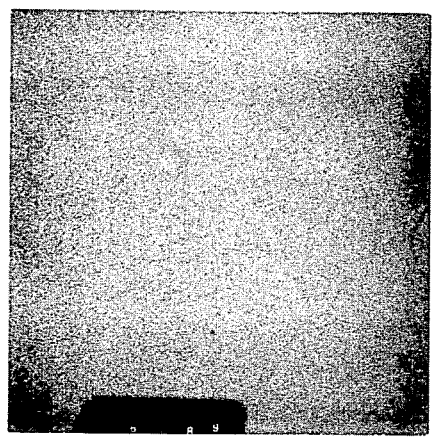
FIG. 5 is an electron microphotograph of the carbon-carbon composite of this invention which is before electrolytical ethcing in water acidified with sulfuric acid.
Figure 6:
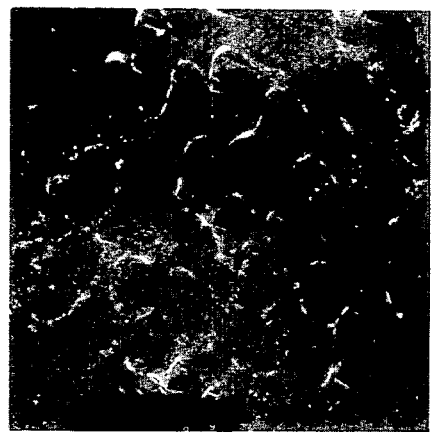
FIG. 6 is an electron microphotograph of the fracture surface of the composite material which has been electrolytically etched.

The surface of the composite before the etching and the etched surface of the composite were observed by a scanning electron microscope. Electron microphotographs of these surfaces are shown in FIGS. 5 and 6. FIG. 5 shows the surface of the composite before the etching, while FIG. 6, the etched surface of the composite. The surface was homogeneous in FIG. 5. After the etching, the matrix portion can be distinguished from the fibrous reinforcing portion as shown in FIG. 6 because the degree of etching of the matrix portion is larger than that of the fibrous reinforcing portion.

The weight of the composite before the etching and that after the etching were measured. The electrolytic etching resistance, expressed by (the weight after the etching/the weight before the etching)×100, of the composite was 82%.

For comparison, a mixture obtained by adding 1% by weight of aniline sulfate to furfuryl alcohol was coated by the multilayer coating method disclosed in Japanese Patent Publication No. 5153/64 (by which the coating-curing cycle was repeated to form a thick coating) to form precursor. The precursor was fired in the same way as above to form a vitreous carbon product having substantially the same shape as the carbon-carbon composite described above.

The resulting vitreous carbon product had a gas permeability of $10^{-9}$ cm$^2$/sec., but a flexural strength of as low as 700 kg/cm$^2$.

When the resulting vitreous carbon product was electrolytically etched under the same conditions as described above, no local variation in the degree of etching was observed, and the product was uniformly etched.

The electrolytic etching resistance of the vitreous carbon product, measured by the same method as in the carbon-carbon composite described above, was found to be 69%.

COMPARATIVE EXAMPLE

This Comparative Example demonstrates that cured resol fibers are unsuitable as the fibrous reinforcing material.

(A) Preparation of resol fibers

Phenol (94 g; 1 mole), 39 g (1.3 moles) of formaldehyde and 0.85 g (0.05 mole) of ammonia were mixed, and heated at 90° C. By varying the heating time, several resol resins were prepared. Each of these resol resins were subjected to a melt-spinning operation. As a result, it was found extremely difficult to melt-spin these resins, and the yield [(the weight of fibers obtained the weight of the resin charged)×100] was 0 in most cases.

Two resol resins which seemed to have relatively good spinnability were further examined as to conditions for spinning them. Each of the two resins was spun through a spinneret having an orifice diameter of 0.2 mm at an extruding pressure of 50 cm $H_2O$ at the spinning temperatures and maximum spinning speeds shown in Table 7 to form resol fibers although in small amounts.

When these two kinds of resol fibers were heat-treated at 150° C. for 30 minutes, they were melted. Thus, when the fibers were first treated in a 20% aqueous solution of hydrochloric acid at 90° C., scrap-like cured resol fibers were formed. The characteristics of the resol fibers from which these cured resol fibers could be obtained, the behaviors of the resol resins at the time of spinning, the spinning conditions, and the properties of the cured resol fibers were determined, and shown in Table 7.

Table 7

| Resin No. | | R-1 | R-2 |
|---|---|---|---|
| Resol resin | Number average molecular weight | 450 | 370 |
| | Gellation time | 150° C. × 140 sec. | 140° C. × 120 sec. |
| Spinning | Behavior at the time of spinning | At 100° C., the spinning solution had a low viscosity. | At 90° C., the spinning solution had a low viscosity. |
| | | At 108° C., spinning was possible for 12 seconds. | At 95° C., spinning was possible for 8 seconds. |
| | | At 120° C., the spining solution foamed and gelled. | At 115° C., spinning solution foamed and gelled. |
| | | (At 108° C., too, the spinning solution gelled in 10 minutes.) | (At 95° C., too, gellation occurred in 10 minutes.) |
| | Temperature (°C.) | 108-120 | 95-115 |
| | Maximum spinning speed (m/min.) | 200 | 150 |
| Properties of the cured resol | Fiber diameter (microns) | 28.3 | 28.5 |
| | Tenacity | | |

Table 7-continued

| Resin No. | | R-1 | R-2 |
|---|---|---|---|
| fibers | (g/d) | 0.9 | 0.7 |

(B) Preparation of a carbon-carbon composite

The cured resol fibers prepared from resin R-1 and having a higher tenacity than those prepared from R-2 resin were cut to a length of 6 mm, and mixed by a kneader with a resol resin having a number average molecular weight of 220 and a gellation time of 140° C.×100 sec. so that the fiber content became 50% by weight. The mixture was shaped and cured in the same way as in Example 1 to form a precursor having a width of 25 mm, a thickness of 3 mm and a length of 70 mm. The resulting precursor had a heat distortion temperature of 120° C. and a tensile strength of 4.5 kg/mm$^2$.

The precursor was fired in the same way as in Example 1 to form a carbon-carbon composite.

The yield of the carbon-carbon composite was as low as 8%. It had a gas permeability of $10^{-4}$ cm$^2$/sec. and a flexural strength of 530 kg/cm$^2$. Hence, the resulting carbon-carbon composite was remote from the carbon-carbon composite of this invention having a high flexural strength and a low gas permeability.

What we claim is:

1. A method for producing a carbon-carbon composite material consisting of a matrix carbon and a fibrous reinforcing carbon, which comprises shaping a resinous composition consisting of 30 to 90% by weight of cured novolac fibers having a methylol group content of at least 3.5% by weight and 10 to 70% by weight, as the solids content after curing, of a phenolic resin; curing the shaped product; heating the cured product in an non-oxidizing atmosphere to at least 800° C. in such a manner that at least within a temperature range of 200° to 500° C., the heating is carried out at a rate of not more than 60° C./hour; and firing the product at the final temperature reached.

2. The method of claim 1 wherein the cured novolac fibers have a methylol group content of 4 to 8% by weight.

3. The method of claim 1 or 2 wherein the resinous composition contains the cured novolac resins in an amount of 50 to 80% by weight.

4. The method of any one of claims 1 or 2 wherein the phenolic resin is a resol resin.

5. The method of claim 1 wherein the phenolic resin is a novolac resin, and the curing of the shaped resinous composition is carried out by using formaldehyde or a compound capable of liberating formaldehyde under the curing conditions.

6. The method of any one of claims 1 or 2 wherein shaping and curing of the resinous composition are carried out under heat and pressure.

7. The method of any one of claims 1 or 2 wherein the heating of the cured product is carried out in such a manner that at least within a temperature range of 200° to 500° C., the heating is carried out at a rate of not more than 40° C./hour.

8. The method of any one of claims 1 or 2 wherein the firing treatment is carried out at a temperature of at least 1,000° C.

9. A carbon-carbon composite material consisting of a matrix carbon and a fibrous reinforcing carbon, said matrix carbon and fibrous carbon consisting substantially of amorphous optically isotropic carbon and forming an interface without an intervening third material, wherein said composite material has a fracture surface showing a uniform vitreous light reflection, but when it is used as an anode and electrolytically etched in sulfuric acid-acidified water, a difference in the degree of etching arises between the matrix carbon and the fibrous carbon produced by the method of claim 1.

10. The composite material of claim 9 which has a broad diffraction profile at a diffraction angle of 26° when measured by an X-ray diffraction method.

11. The composite material of claim 9 or 10 which has a flexural strength of at least 900 kg/cm$^2$ and a helium gas permeability of more than $1 \times 10^{-6}$ cm$^2$/sec.

12. The composite material of any one of claims 9 or 10 which has a carbon content of at least 94% by weight.

13. The composite of claim 12 which has a carbon content of at least 96% by weight.

14. The composite of any one of claims 9 or 10 wherein the matrix carbon and the fibrous reinforcing carbon have the same density.

* * * * *